United States Patent [19]
Price

[11] 3,813,746
[45] June 4, 1974

[54] TOOL HOLDER

[75] Inventor: Philip A. Price, Franklin, Mich.

[73] Assignee: Joseph C. Jordan, Howell, Mich.; a part interest

[22] Filed: Mar. 5, 1973

[21] Appl. No.: 337,911

[52] U.S. Cl. .................................................. 29/96
[51] Int. Cl. .................................................. B26d 1/02
[58] Field of Search ................................. 29/95, 96

[56] References Cited
UNITED STATES PATENTS

| | | | |
|---|---|---|---|
| 3,436,799 | 4/1969 | Kopy | 29/96 |
| 3,497,934 | 4/1970 | Hudson | 29/96 |
| 3,514,826 | 6/1970 | Dawkins et al. | 29/96 |
| 3,525,136 | 8/1970 | Crosby | 29/96 |

Primary Examiner—Andrew R. Juhasz
Assistant Examiner—W. R. Briggs
Attorney, Agent, or Firm—Barnes, Kisselle, Raisch & Choate

[57] ABSTRACT

A tool holder having a triangularly shaped cutting tool insert indexably mounted thereon. The support structure for the insert includes a recess in the tool holder having a wall inclined at an angle of 60° to the forward top face portion of the holder against which one of the three end faces of the insert is seated and a slightly undersize pin in the recess engaging the central opening through the insert with a clamping block on the forward top face portion of the holder forcing the insert downwardly against the pin and inclined face.

6 Claims, 2 Drawing Figures

PATENTED JUN 4 1974  3,813,746

TOOL HOLDER

This invention relates to tool holders and, more specifically, to a tool holder with an indexable cutting tool insert mounted thereon.

Tools used for cutting grooves in workpieces are frequently in the form of an equilateral, triangularly shaped insert mounted on a holder in a manner to permit the insert to be indexed increments of 120° so that the cutting edges at the three corners of the insert can be used successively before the insert is discarded. In using such an insert it is extremely important that it be retained on a holder in a very rigid manner. At the same time, from the standpoint of economy it is desirable to design the holder to avoid expensive machining operations and also to permit ready removal, replacement and indexing of the insert.

The present invention has for its object the provision of a tool holder and a cutting tool insert of the type described which are designed to locate the cutting tool rigidly and in an accurate position on the holder and which at the same time utilizes a holder of economical construction. Furthermore, the holder enables the insert to be removed, replaced and indexed very readily and quickly.

Figure 1:
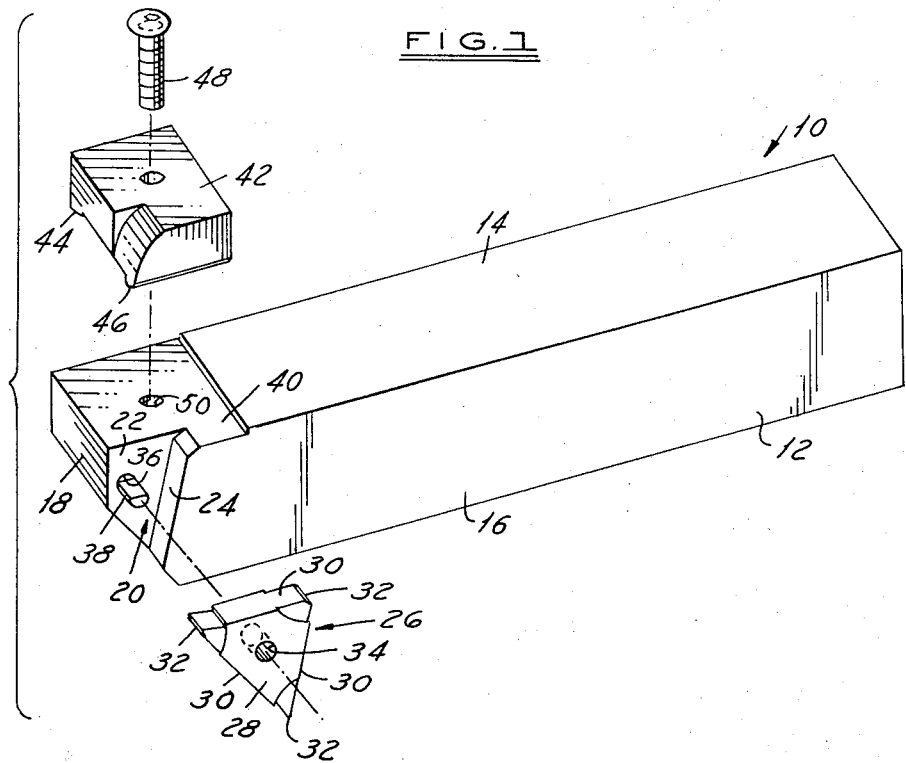
Figure 2:
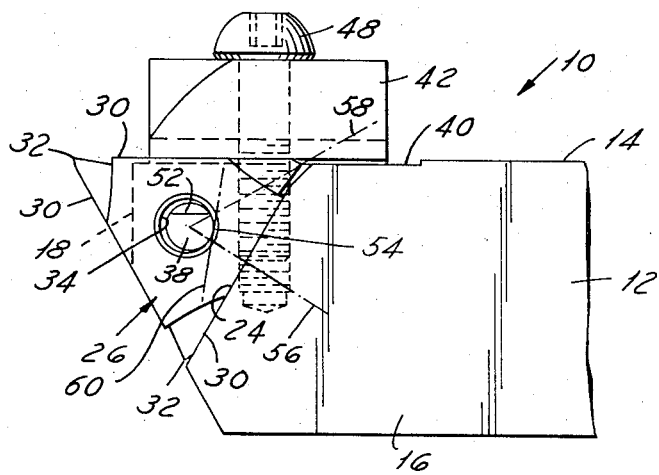

Other objects and features of the present invention will become apparent from the accompanying description and drawing, in which:

FIG. 1 is a perspective exploded view of the tool holder and insert assembly; and FIG. 2 is a fragmentary side elevational view, on an enlarged scale, illustrating the manner in which the cutting tool insert is clamped on the holder.

While the holder of the present invention may take numerous forms within the scope of the invention, the holder illustrated, generally designated 10, is shown with a rectangularly shaped shank 12 having a top wall 14, a side wall 16 and a front end wall 18. At the front end of shank 12 there is formed a recess 20 defined by a vertically extending wall 22 disposed in a plane perpendicular to top wall 14 and a second wall 24 which is perpendicular to wall 22 and inclined to the plane of top wall 14 downwardly and forwardly at an angle of 60°. Recess 20 is shaped to receive a cutting tool 26 in the form of an equilateral, triangularly shaped insert having a pair of opposite side walls 28 and three triangularly related end walls 30. The end walls 30 intersect at each corner of the insert to form cutting edges 32 extending transversely between the opposite side walls 28. At the axial center thereof insert 26 is provided with a circular opening 34 extending circumferentially through the opposite side walls 28.

In the wall 22 of recess 20 formed in shank 12 there is provided a cylindrical socket 36 in which is press fitted or otherwise suitably secured a cylindrical hardened steel pin 38. Pin 38 has a diameter slightly less than the diameter of opening 34 in insert 26 and is disposed to register with opening 34 when the insert is seated in recess 20 as illustrated in FIG. 2. The actual difference in diameters between pin 38 and opening 34 is preferably on the order of 0.010 to 0.015 inches, but for purposes of illustration the clearance between pin 38 and opening 34 is shown highly exaggerated in FIG. 2. When insert 26 is seated in recess 20 as shown in FIG. 2 it will be noted that the front end wall 18 of the holder is disposed rearwardly of the cutting edge 32 at the upper front corner of the insert. It will also be observed that the top edge face 30 of the insert is located at least slightly above the stepped top face 40 of shank 12.

To lock the insert in the position illustrated in FIG. 2 there is provided a clamping block 42 of generally rectangular shape and having downwardly projecting ribs 44,46 at the opposite ends of the bottom face thereof. Block 42 is centrally apertured to receive a clamping screw 48 which is adapted to be threaded into socket 50 extending downwardly from the stepped top face 40 of shank 12. When clamping block 42 is positioned on stepped face 40 as shown in FIG. 2 rib 44 engages the stepped face 40 while rib 46 engages the upper end face 30 of the insert. Thus, when clamping screw 48 is tightened, the insert is locked in place in recess 20.

In order to assure proper clearance to achieve the desired locking action the upper portion of pin 38 is cut away as at 52. The cut away section 52 is spaced radially above center relative to the axis of pin 38 and preferably is not in excess of that required to achieve the hereinafter mentioned locking action. In view of the fact that pin 38 has a diameter slightly smaller than that of opening 34 pin 38 is located on the holder so that its axis offset slightly to the right as viewed in FIG. 2 relative to the axis of opening 34. The difference in diameter between pin 38 and opening 34 and the extent of the cut away section 52 of the pin are such that, when block 42 is clamped down tightly by screw 48, the area of contact between pin 38 and the edge of opening 34 is generally at the portion designated 54. This contact area lies between a line 56 extending from the center of pin 38 perpendicular to the wall 24 and a line 58 extending from the center of pin 38 to the upper rear apex of insert 26. Thus, the tangent at the point of contact 54, which is designated by line 60, forms a small acute angle of less than 30° with the wall 24 of recess 20. Thus, as a downward clamping force is exerted on the upper end face 30 of insert 26 pin 38 causes the insert to be rigidly locked on the holder in wedging relation between it and the inclined wall 24 of recess 20.

The above described arrangement not only produces a wedge locking action which results in a very rigid tool supporting structure, but also produces another advantage. It will be appreciated that as a practical matter it is impossible to locate opening 34 at the exact central axis of insert 26 and it is also virtually impossible to form opening 34 on successive blanks to exactly the same size. Thus, as the insert is rotatably indexed to present a new cutting edge or as a new insert is mounted on the holder, as a practical matter the operative cutting edge 32 will not always be located at exactly the same position in relation to the holder. However, in view of the fact that wall 24 is inclined at an angle of 60° to the top face of shank 12, the previously mentioned tolerances will result in the leading cutting edge 32 being shifted slightly upwardly and downwardly to a substantially greater extent than this leading cutting edge is shifted forwardly and rearwardly. Thus, the dimensional tolerances previously referred to result in a minimum variation in the depth of cut in a production set-up where the cutting depth is determined by a stop or other means for limiting the extent to which the tool holder is advanced toward the workpiece.

It will be appreciated that the relative sizes of a pin 38 and opening 34 are determined to a large extent by the strength requirements. While an increase in the cross sectional area of pin 38 would obviously increase the strength thereof, nevertheless with an insert of a particular size the diameter of pin 38 is limited by the strength considerations in relation to insert 26. This is to say, if opening 34 in a particular insert is relatively large in comparison with the size of the insert then the insert itself is weak. Accordingly, with smaller inserts the diameters of pin 38 and opening 34 may be of reduced dimensions as compared with substantially larger inserts. In this connection the strength of pin 38 can be maximized by forming the cut away section 52 along an arc rather than a straight chord across the pin so that the clearance between pin 38 and opening 34 at the cut away section will take the form of an upwardly concave crescent shaped cavity.

It will be appreciated that such terms as top, bottom, forward, etc. as used in this description and the appended claims are relative to the specific embodiment illustrated. In the broad sense, these terms should be construed only with reference to the operative cutting edge of the insert so that if the forward top face portion of the holder is inclined rather than horizontal or if the recess 20 is formed on the front end face 18 rather than the side face 16, such terms would be relative to the insert so located.

I claim:

1. In combination, a tool holder and a cutting tool insert of equilateral triangular shape having a cutting edge at each of the three corners thereof which extends transversely between the two opposite side faces of the cutter, said holder comprising a shank having a generally vertically extending recess at the forward end thereof, said recess being defined by two perpendicularly related walls, said forward end of the shank having a generally flat upper face portion, both of said walls extending to and intersecting said upper face portion, said one wall being disposed in a plane perpendicular to the plane of the upper face portion and said other wall being disposed in a plane inclined at an angle of 60° to the plane of said upper face portion, said insert being disposed in said recess with one of said opposite side faces in coplanar engagement with said one wall and one of said end faces in coplanar engagement with said other wall, said insert having a circular opening therethrough at the center thereof, a pin mounted in said holder and projecting outwardly from said one wall with its axis perpendicular to the plane of said one wall, said pin extending through the central opening in said insert and having a smaller diameter than that of the opening, clamp means mounted on said top face portion for urging said insert downwardly along said other wall, said pin being sufficiently smaller in diameter than said opening so that the contact area between the pin and the opening is located circumferentially of the pin between a line extending from the center of the pin perpendicular to said other wall and a second line extending from the center of the pin to the upper rear corner of the insert, whereby said clamp means applies a downward force on the insert to lock the insert in said recess by means of a wedging action between said pin and said other wall.

2. The combination called for in claim 1 wherein the central axis of the pin is eccentrically disposed relative to the opening in the insert, said pin being offset radially in a direction toward said other wall of said recess to compensate for the difference in diameter between the pin and said opening.

3. The combination called for in claim 1 wherein a tangent line at the point of contact between the pin and the opening in the insert is inclined downwardly toward said other wall at an angle of not more than 30° to said other wall.

4. The combination called for in claim 1 wherein said clamping means comprises a clamp block on said top face and a screw for rocking said block so that one portion thereof exerts a downward force on said insert, said pin limiting the extent to which the insert is permitted to be displaced in a forward direction in response to said downward force.

5. The combination called for in claim 4 wherein said one portion of said clamp block bears downwardly on the top end face of the insert behind the operative cutting edge thereof.

6. The combination called for in claim 1 wherein said pin has a portion thereof above its center removed to provide clearance between the upper portion of the pin and said opening in the insert when the insert is forced downwardly against said inclined wall.

* * * * *